United States Patent
Fujiura

[19]

[11] Patent Number: 6,052,359
[45] Date of Patent: *Apr. 18, 2000

[54] DISK CARTRIDGE HAVING A DYNAMICALLY STABLE SUPPORTED MEMBER IN A DISCRIMINATION HOLE

[75] Inventor: Kazuo Fujiura, Tokyo, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,162

[22] Filed: Aug. 19, 1997

[30] Foreign Application Priority Data

Aug. 20, 1996 [JP] Japan ..................................... 8-218815

[51] Int. Cl.[7] ................................................. G11B 23/03
[52] U.S. Cl. ............................................................ 369/291
[58] Field of Search .......................... 369/291; 360/133; 206/307, 308.1, 308.3, 309

[56] References Cited

U.S. PATENT DOCUMENTS

| | | | |
|---|---|---|---|
| 4,476,978 | 10/1984 | Saito | 360/133 X |
| 5,150,354 | 9/1992 | Iwata et al. | 369/291 |
| 5,293,293 | 3/1994 | Iwata et al. | 360/133 |
| 5,715,233 | 2/1998 | Yoshida et al. | 369/291 X |
| 5,748,609 | 5/1998 | Tanaka | 369/291 |
| 5,757,764 | 5/1998 | Tanaka | 369/291 |
| 5,764,622 | 6/1998 | Kawamura et al. | 369/291 |

*Primary Examiner*—William R. Korzuch
*Attorney, Agent, or Firm*—Pillsbury Madison & Sutro LLP

[57] ABSTRACT

A lid for closing a disk insertion portion of a cartridge body is controlled to be locked/released by inserting/removing a closing member in holes formed in the lid and the cartridge body. The closing member is supported by a plurality of supporting pieces arranged at regular intervals on the inner periphery of one of the holes in the circumferential direction. The closing member can be removed from the holes by being urged in a direction from one of the flat sections of the cartridge body to the other one of the flat sections.

2 Claims, 5 Drawing Sheets

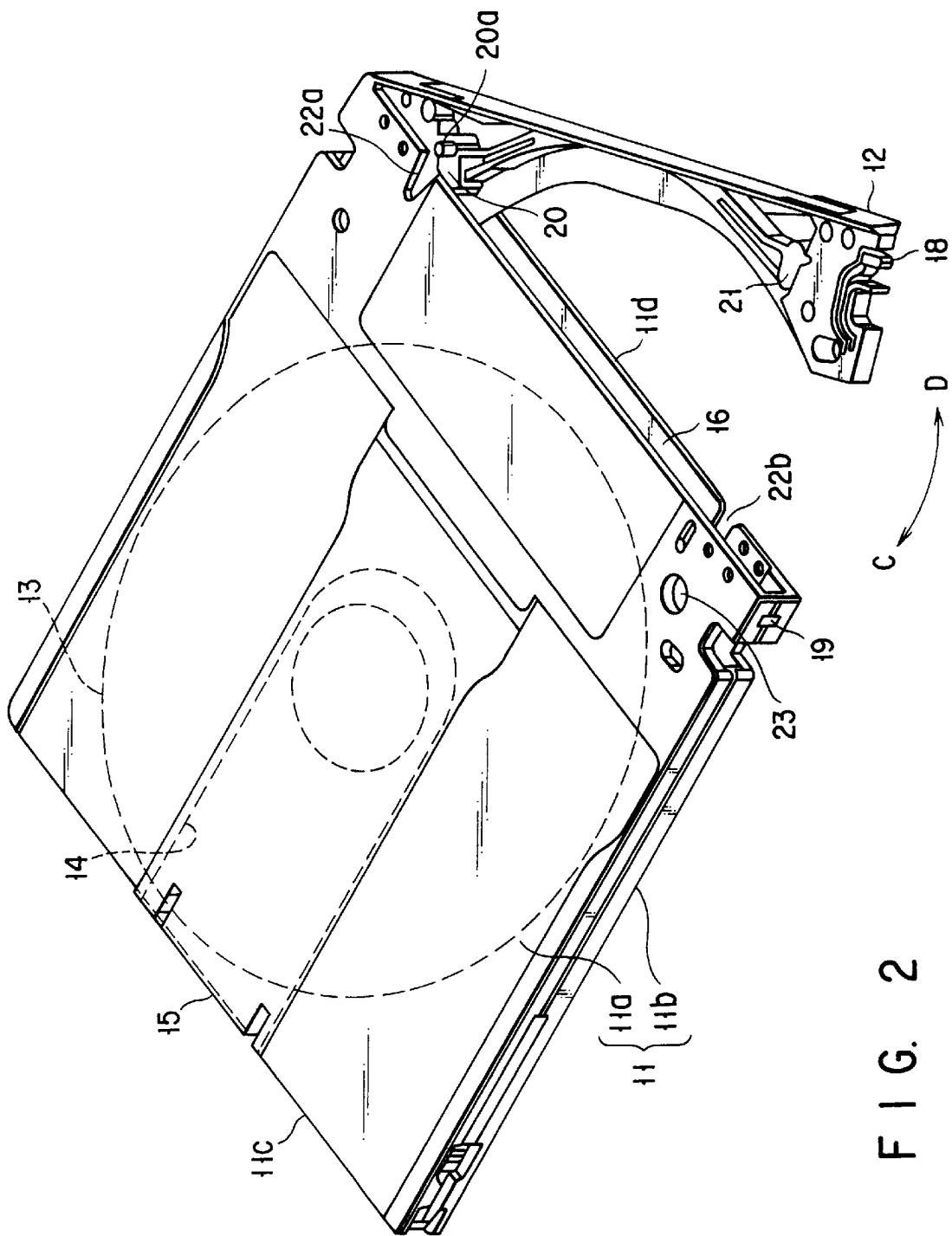
F I G. 2

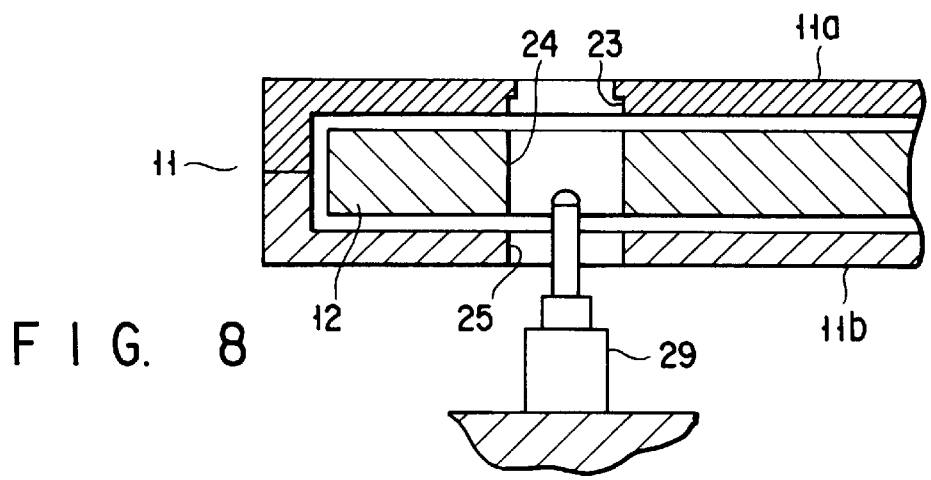
FIG. 8
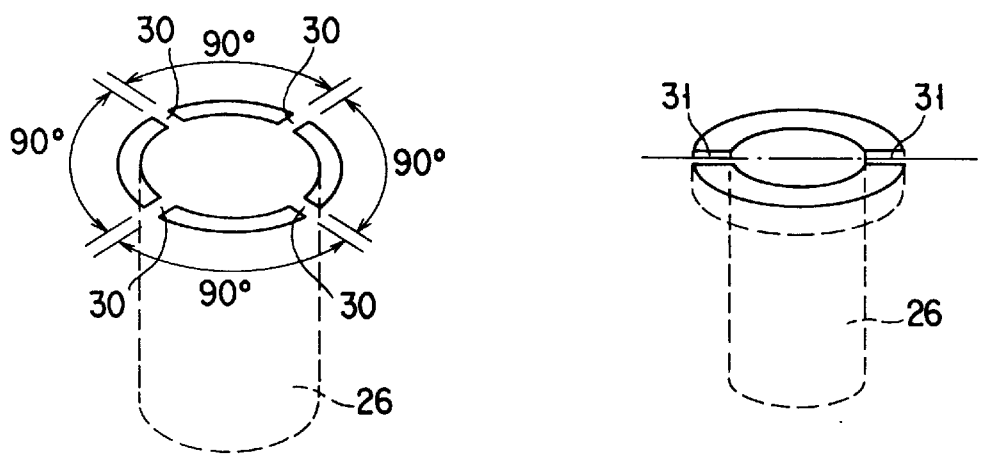
FIG. 9
FIG. 10
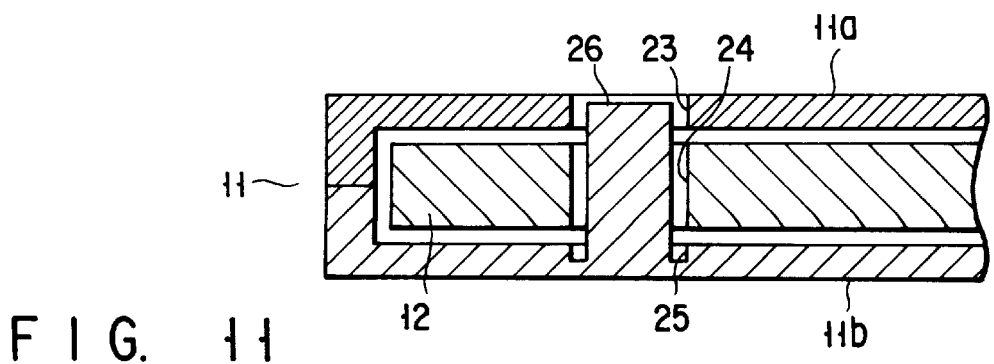
FIG. 11

DISK CARTRIDGE HAVING A DYNAMICALLY STABLE SUPPORTED MEMBER IN A DISCRIMINATION HOLE

BACKGROUND OF THE INVENTION

This invention relates to a disk cartridge for containing, as an information recording medium, a disk such as an optical disk, photomagnetic disk, and magnetic disk, particularly to the improvement of a disk cartridge in which information can be recorded/reproduced on/from the disk contained in the cartridge.

As is well known, a disk cartridge contains a disk in a flat rectangular body such that the disk can be rotated freely. In the cartridge body, a discrimination hole which is unoccupied/occupied by a closing member is formed at a predetermined position.

The information is recorded/reproduced on/from a disk by a disk drive. The disk drive is provided with detecting means for detecting, in the state where the cartridge body is attached to the disk, whether the discrimination hole is occupied or unoccupied. The disk driving mode of the disk drive is set in accordance with the detection result.

Recently, a cartridge body having a disk insertion portion provided with a lid capable of opening/closing the cartridge body is formed at a distal end portion has been put into the market. Such a cartridge body has been developed to enhance the free degree in use of the disk such that the disk can be taken out of the cartridge to be independently used.

The lid of the cartridge body has a hole therein. The hole communicates with the discrimination hole when the lid is locked. In the cartridge body, a pin member as a closing member is inserted into the discrimination hole and the hole on the lid to occupy the holes such that the lid is not released.

The lid of the cartridge body can be released by removing the pin member from the holes. The pin member is formed integrally with supporting pieces at the inner periphery of the discrimination hole of the cartridge body so as to be supported thereby. This pin member can be removed from the cartridge body when the supporting pieces are cut by bending or breaking.

With this structure, when the discrimination hole and the hole in the lid are detected to be occupied by the pin member, the disk drive determines that the lid has been never released, that is, the disk contained in the cartridge body has been never taken out.

If the discrimination hole and the hole in the lid are detected not to be occupied by the pin member, the disk drive determines that the lid has been released, that is, the disk contained in the cartridge body has been taken out.

The disk driving mode of the disk drive is set in accordance with the determination. If the disk has been taken out from the cartridge body, there is more possibility that dust may be attached to the disk or the disk may be damaged in comparing with the case where the disk has not been taken out from the cartridge body.

The conventional disk drive is therefore designed to change the performance or function of each circuit block for recording/reproducing information, i.e., to change the disk driving mode, in accordance with whether or not the disk has been taken out, such that the information can be recorded/reproduced under the optimum condition most suitable for the disk on/from which the information is recorded/reproduced.

The supporting pieces for supporting the pin member in the conventional disk cartridge are, however, not suitable for normal use if easily broken due to the external force applied to the supporting pieces during the normal operation. On the other hand, if the supporting pieces cannot be easily cut when the pin member is desired to be manually removed from the apparatus, the supporting pieces cannot be said to be practical.

Accordingly, the structure or size of the supporting piece for supporting the pin member has been eagerly desired to be improved so as not to be easily broken by an external force applied to the disk drive during normal operation and so as to be easily cut when the pin member is intended to be manually removed from the apparatus.

BRIEF SUMMARY OF THE INVENTION

The object of the present invention is therefore to provide a disk cartridge which is improved so that a closing member for occupying the discrimination hole can be supported in a manner suitable for normal use.

The disk cartridge according to the present invention comprises a cartridge body formed as a flat box, for containing a disk therein to be freely rotated, the cartridge body having flat sections facing each other on each of which an opening for exposing a part of a surface of the disk to the outside, the cartridge body being provided at a position on a side wall with a disk insertion portion from which the disk is taken in/out; a shutter slidably provided to the cartridge body, for closing the openings formed on the facing flat sections of the cartridge body; a lid supported by the cartridge body so as to be freely moved between a closing position at which the disk insertion portion is closed and an opening position at which the disk insertion portion is opened, the lid having a flat portion to be placed between the facing flat sections of the cartridge body when the lid is placed at the closing position; holes formed in the facing flat sections of the cartridge body and the flat portion of the lid such that the cartridge body is penetrated in a thickness direction of the cartridge body at a position where the holes are located when the lid is placed at the closing position; a closing member provided to the holes to occupy the holes, for preventing the lid from being released, the closing member releasing the lid when the closing member is removed from the facing flat sections to empty the holes; and a plurality of supporting pieces formed on an inner periphery of the hole formed in one of the flat sections of the cartridge body and arranged at regular intervals in a circumferential direction, the supporting pieces connecting the closing member and the inner periphery of the hole formed in the one of the flat sections so as to support the closing member in the hole.

According to the above-mentioned structure, the closing member for controlling the lid to be locked/released is supported by a plurality of supporting pieces formed on the inner periphery of the discrimination hole in one flat portion of the cartridge body and arranged at regular intervals in the circumferential direction. With this arrangement, the supporting pieces cannot be easily broken due to the external force applied to the closing member during normal use. Accordingly, the supporting pieces can be formed with a minimum thickness, and thus can be easily cut when the supporting pieces are desired to be manually removed from the apparatus. Therefore, the closing member can be supported in a suitable manner for normal use.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view of a disk cartridge according to an embodiment of the present invention, which shows that a lid of the cartridge body is released;

FIG. 8 is a sectional view showing that the detecting switch detects the absence of the pin member in the hole of the cartridge body;

FIG. 9 is a perspective view showing a modification of the structure for supporting the pin member in the hole of the cartridge body of this embodiment;

FIG. 10 is a perspective view showing another modification of the structure for supporting the pin member in the hole of the cartridge body of this embodiment; and FIG. 11 is a sectional view showing still another modification of the structure for supporting the pin member in the hole of the cartridge body of this embodiment.

DETAILED DESCRIPTION OF THE INVENTION

Figure 1:
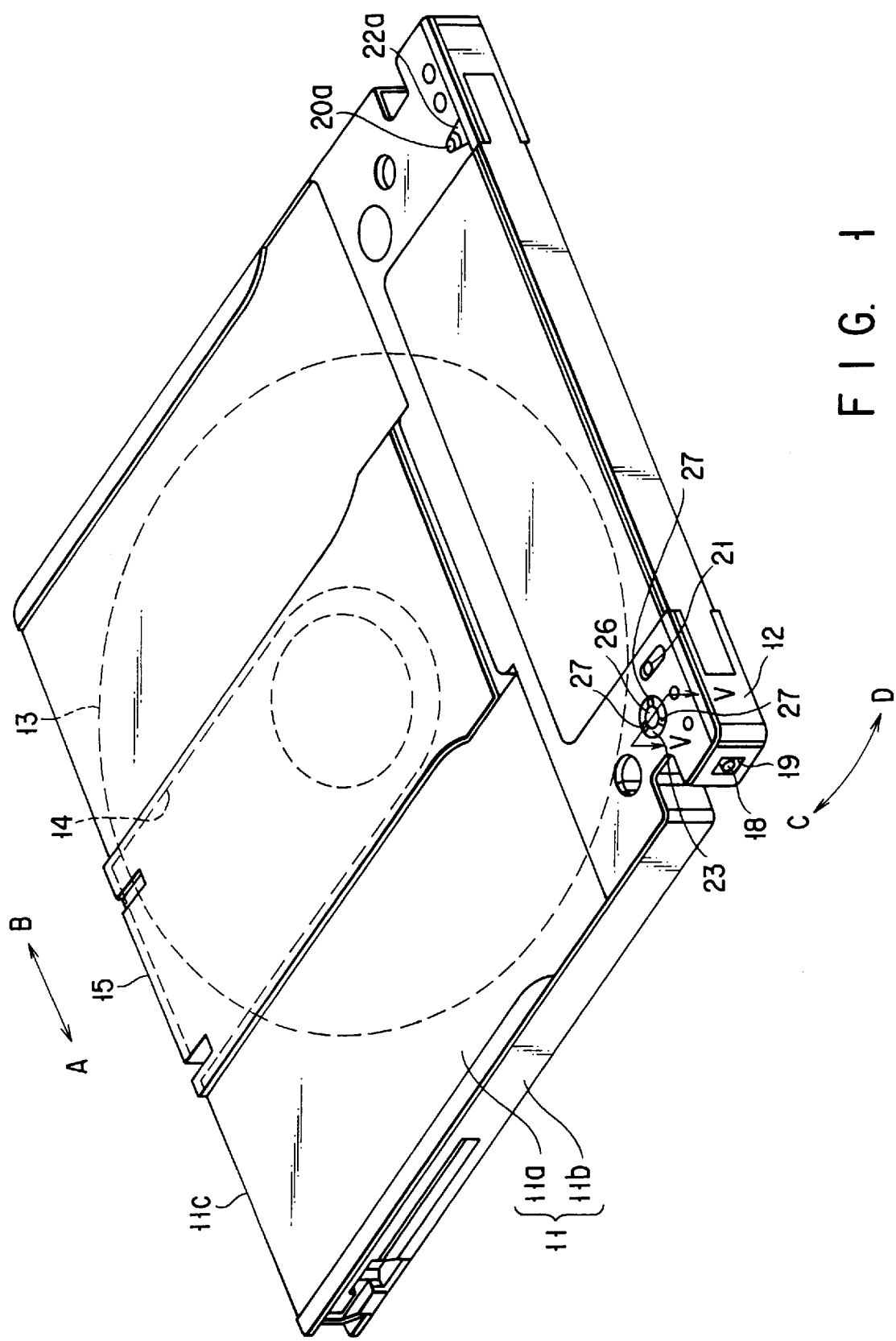
FIG. 1 is a perspective view of a disk cartridge according to an embodiment of the present invention, which shows that a lid of a cartridge body is locked.

This invention can be more fully understood from the following detailed description when taken in conjunction with the accompanying drawings. FIGS. 1 and 2 show the outer views of a cartridge body 11 to be described in the embodiment. FIG. 1 shows that a lid 12 provided to the cartridge body 11 is locked, and FIG. 2 shows that the lid 12 is released from the cartridge body 11.

The cartridge body 11 is formed as a flat rectangular box by joining an upper case 11a and a lower case 11b together, which are formed to be substantially symmetrical from synthetic resin material such as ABS. The cartridge body 11 contains a disk 13 such as an optical disk with a predetermined clearance from the inner wall of the cartridge body 11 such that the disk can be rotated freely in the cartridge body.

The upper case 11a and lower case 11b respectively face the side A and side B of the disk 13 enclosed thereby. Each of the upper case 11a and lower case 11b has an opening 14 which has a predetermined width extending from the central portion of the cartridge body 11 to a front end face 11c (the opening 14 of the lower case 11b is not shown in the drawing).

The openings 14 of the upper case 11a and the lower case 11b respectively face the side A and side B of the disk 13, and thus each of the side A and side B of the disk 13 is exposed to the outside through the opening 14 at the region from the center about which the disk is rotated to the outer periphery of the disk.

The cartridge body 11 has a shutter 15 which is slidably moved to simultaneously close the openings 14 in the upper and lower cases. The shutter 15 is formed by folding trice a thin metal plate along the outer wall of the cartridge body, and put on the cartridge body 11 at the front end face 11c.

The shutter 15 is provided to the cartridge body 11 so as to slide between the closing position at which the shutter 15 closes the openings 14 and the two opening positions located on the both sides of the closing position, at which the shutter 15 slides in a direction parallel to the front end face 11c of the cartridge body 11 (i.e., in the direction shown in FIG. 1 by an arrow A–B) in order to open the openings 14. The shutter 15 is constantly urged by a spring (not shown) so as to be located at the closing position.

At a rear end face 11d, the cartridge body 11 is provided with a disk inlet 16 through which the disk 13 is inserted/ejected into/from the cartridge body 11. The disk inlet 16 extends for the overall length of the rear end face 11d.

The lid 12 for closing the disk inlet 16 is supported by the cartridge body 11 (the cartridge body 11 is attached to a disk drive [not shown] with the front end face 11c in the lead) such that the lid 12 can be freely rotated.

Figure 3:
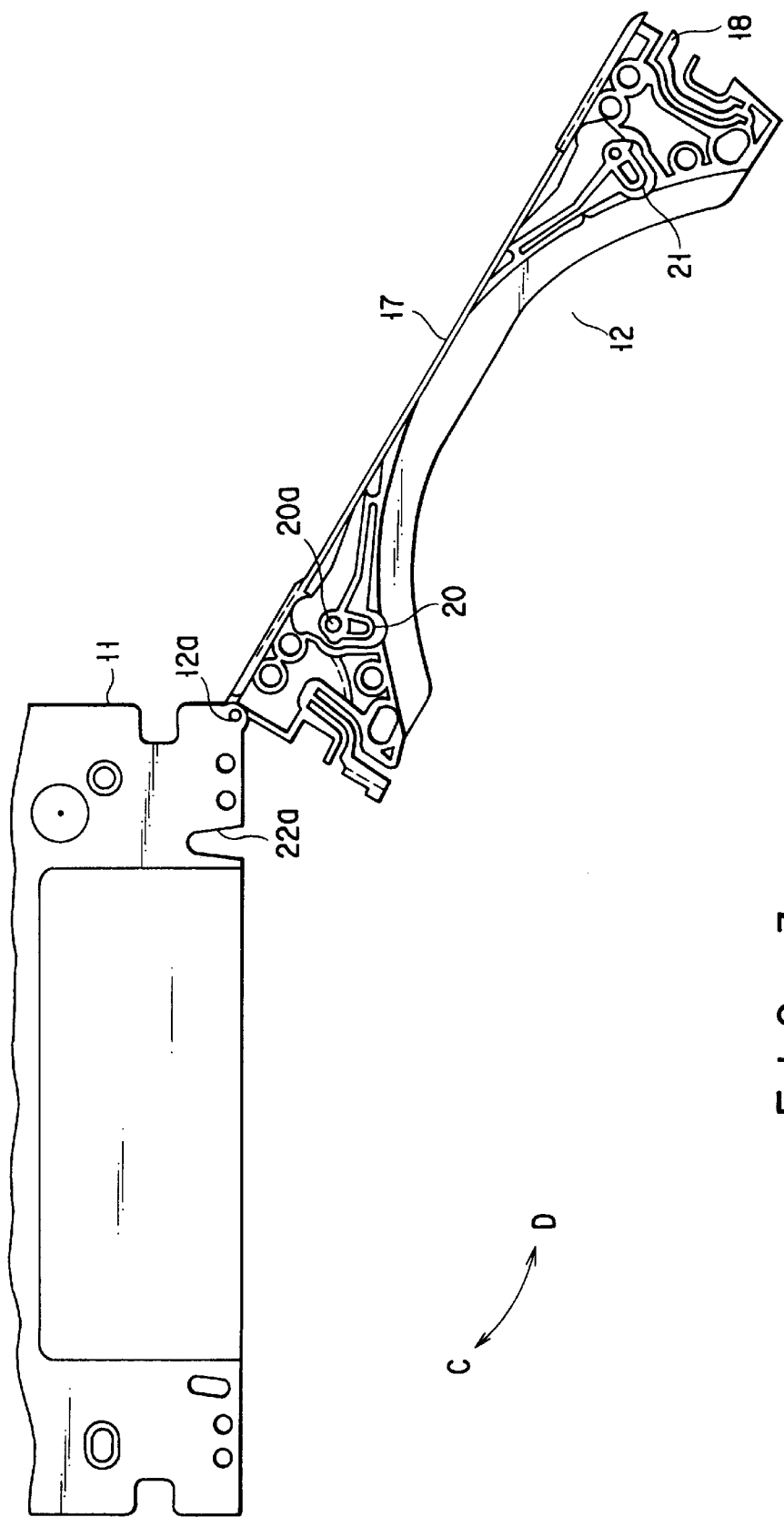
FIG. 3 is a plane view precisely showing the released lid of the disk cartridge according to this embodiment.

As shown in FIG. 3, the lid 12 is formed in a long flat plate having substantially the same length as that of the disk inlet 16 and has such a thickness that the lid 12 can be inserted into the disk inlet 16. The lid 12 is provided on the front face with a flange 17 extending for the overall length of the disk inlet 16.

The flange 17 is protruded from the lid 12 to the both sides in a direction of thickness of the cartridge body 11 i.e. larger than the lid 12 in vertical size. The lid 12 and flange 17 are integrally formed from synthetic resin material with the different color from that of the cartridge body 11.

The lid 12 is supported at one end portion rotatably about an axis 12a at the position shown at the right back corner (the lid 12 is provided at the right end of the flange 17 and the rear end face 11d) of the cartridge 11 shown in FIG. 3. More specifically, the lid 12 is rotated about the axis 12a in a direction indicated by an arrow C–D, thereby opens/closes the disk inlet 16.

The lid 12 is rotated and put into the cartridge body 11 through the disk inlet 16. In this time, the flange 17 contacts the rear end face lid of the cartridge body 11 and closes the disk inlet 16.

On the other hand, a free end portion of the lid 12 (i.e., the end portion on the side opposite to the side on which the axis 12a is provided) is formed integrally with a lock craw 18 capable of being flexibly transformed. In the cartridge body 11, a connection hole 19 is formed at the position corresponding to that of the lock craw 18 when the lid 12 is locked, at which the lock craw 18 is connected with the cartridge body 11.

With this structure, the lock craw 18 is connected to the connection hole 19 when the lid 12 is rotated to the position at which the lid 12 closes the disk inlet 16, thereby the lid 12 is locked at the closing position. When the lock craw 18 is urged into the connection hole 19 from the outside of the cartridge body 11, the locked lid 12 is released.

In the lid 12, the first and second write-protect control sections 20 and 21 are formed integrally with the lid 12 to be given a predetermined space such that the control sections 20 and 21 can be flexibly transformed. The first and second write-protect control sections 20 and 21 are arranged at positions respectively corresponding to predetermined positions on the faces A and B of the disk 13. Each of the first and second write-protect control sections 20 and 21 is integrally formed with the lid 12 to form a hinge. The first write-protect control section 20 has a switching element 20a at the distal end portions (the second write-protect control section 21 is also provided with a switching element, but not shown in the drawing).

In the upper case 11a, a insertion hole 22a is formed to cut a part of the rear end face lid near the axis 12a. In the lower case 11b, a insertion hole 22b is formed to cut a part of the rear end face lid near the connection hole 19.

When the lid 12 is locked, the switching element 20a of the first write-protect control section 20 and the switching element of the second write-protect control section 21 of the lid 12 are respectively inserted in the insertion hole 22a of the upper case 11a and the insertion hole 22b of the lower case 11b.

The above-mentioned cartridge body 11 is manufactured in the following manner:

In assembling the cartridge body 11, the lid 12 is located at a predetermined position on the lower case 11b, at first. In this time, the lid 12 is placed such that the axis 12a integrally formed with the lid 12 is introduced into the bearing hole (not shown) formed in the lower case 11b.

Substantially, the upper case 11a is joined to the lower case 11b so as to put the axis 12a into the bearing hole (not shown) formed on the upper case 11a. In this manner, the lid 12 is attached to the upper case 11a and the lower case 11b so as to be rotated about the axis 12a arranged therebetween.

Figure 4:
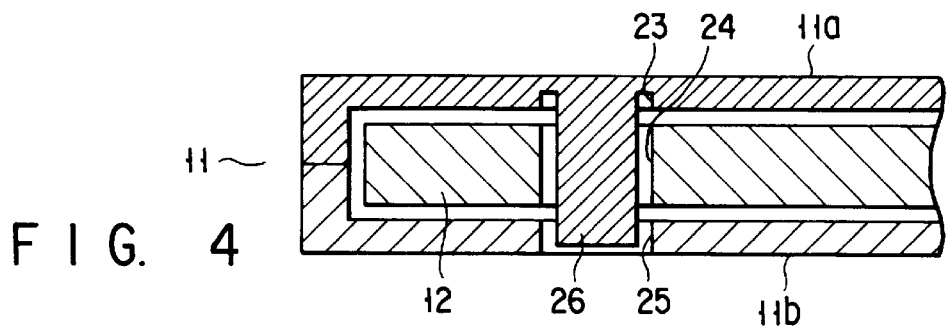
FIG. 4 is a sectional view of the cartridge body of this embodiment, showing that the discrimination hole of the cartridge body and an hole in the lid, which is communicated with the discrimination hole, are occupied by a pin member.

In the upper case 11a of the cartridge body 11, a circular discrimination hole 23 is formed near the connection hole 19, as shown in FIG. 1. FIG. 4 shows a sectional view of the cartridge body 11 taken along a line V—V in the thickness direction so as to show the section of the hole 23.

As shown in this drawing, an hole 24 to communicate with the discrimination hole 23 is formed in the lid 12 when the lid 12 is located at the closing position. Also in the lower case 11b of the cartridge body 11, a discrimination hole 25 to communicate with the hole 24 of the lid 12 is formed. The discrimination hole 23 of the upper case 11a, the hole 24 of the lid 12, and the discrimination hole 25 of the lower case 11b are formed such that the cartridge body 11 is penetrated in a direction of the thickness of the cartridge body.

Each of the discrimination hole 23 of the upper case 11a, the hole 24 of the lid 12, and the discrimination hole 25 of the lower case 11b are occupied by a pin member 26 as a closing member having a diameter a little smaller than that of the holes 23–25 and formed in a substantially column shape. When the pin members 26 are inserted into the holes 23–25, the lid 12 is prevented from being released.

Figure 5:
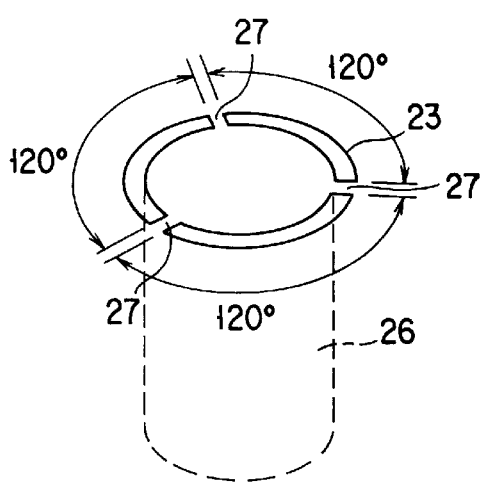
FIG. 5 is a perspective view showing the pin member is supported by several supporting pieces on the inner periphery of the discrimination hole in the cartridge body of this embodiment.

As shown in FIG. 5, the circumferential portion of the head of the pin member 26 located in the discrimination hole 23 of the upper case 11a is connected to the inner periphery of the discrimination hole 23 by a plurality (three in the shown apparatus) of supporting pieces 27. The upper case 11a, the pin members 26, and the supporting pieces 27 are integrally formed.

The three supporting pieces 27 in the drawing are arranged at regular intervals of 120° along the inner periphery of the discrimination hole 23 of the upper case 11a. With this arrangement, the three supporting pieces 27 support the pin member 26 such that a moment will not be easily generated on the pin member 26.

As described above, the supporting pieces 27 are arranged at regular intervals of 120° along the inner periphery of the discrimination hole 23 to support the pin member 26, and thus cannot be easily broken due to an external force applied to the pin member 26 during normal use. Accordingly, the supporting pieces 27 can be formed to be possibly thin, and thus can be easily cut when the supporting pieces 27 are desired to be manually removed from the apparatus.

Figure 6:
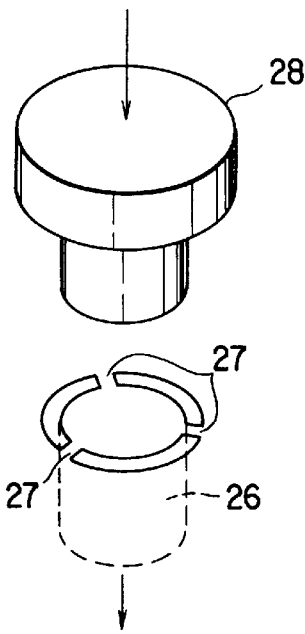
FIG. 6 is a perspective view showing the method of taking out of the pin member from the cartridge body of this embodiment.

In order to release the lid 12 to take the disk 13 out of the cartridge, the pin members need to be removed from the holes 23–25, in advance. In this time, the pin member 26 can be removed from the hole by applying a force to the pin member 26 with use of a tool 28 as shown in FIG. 6 in a direction indicated by an arrow to break the supporting pieces 27 and push out the pin member 26 in the thickness direction of the cartridge body 11. The pin member 26 can be removed without the tool 28, by using the pinpoint of a ball-point at hand then, for example.

Figure 7:
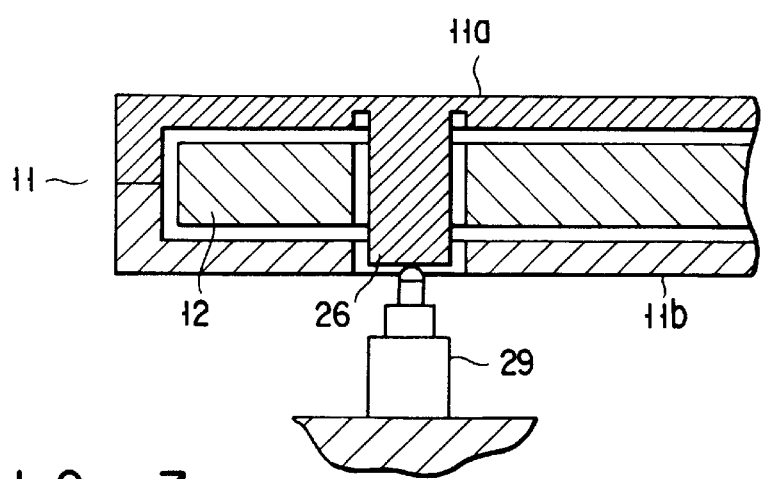
FIG. 7 is a sectional view showing that a detecting switch of the disk drive detects the presence of the pin member in the hole of the cartridge body.

When the cartridge body 11 with a pin member is attached to the disk drive, a detection switch 29 provided to the disk drive are urged by the pin member 26 as shown in FIG. 7, and turned on thereby. Therefore, when the detection switch 29 is turned on, the cartridge body 11 is determined to be a cartridge body from which the disk 13 has not been taken.

When the cartridge body 11 from which the pin member 26 is removed is attached to the disk drive, the detection switch 29 is inserted into the holes 23–25 in which the pin member 26 was located. The switch 29 is not urged by pin member 26 as shown in FIG. 8, and is not turned on. It is therefore determined that the lid 12 of the cartridge body 11 has been released, that is, the cartridge body 11 from which the disk 13 has been taken out.

When the disk 13 has been taken out, the disk driving mode is set such that the recording/reproduction of information is performed, after the result of the verifying operation performed for an entire area of the disk 13 to determine whether information can be written or cannot be written in the region due to dust or scratch is written in a predetermined region of the disk 13.

If the disk 13 has not been taken out of the cartridge body 11, the disk drive is set at the disk driving mode in which the disk drive can record or reproduce information without performing the verifying operation for the entire area of the taken-out disk 13, but merely by reading the verifying result of the predetermined region.

As may be clear from the above, there is a large difference in the time needed for the disk drive to record or reproduce information, i.e., the drive processing speed, between the case where the disk 13 has been taken out from the cartridge body 11 and the case where the disk 13 has not been taken out from the cartridge body 11.

The pin member 26 in the above-mentioned embodiment is arranged to be exposed to the outside of the cartridge body 11 through the discrimination holes 23 and 25 respectively formed on the upper case 11a and the lower case 11b, and thus the detection switch 29 may be arranged to contact either faces of the cartridge body 11. This detection system is also effective when the cartridge body 11 is turned inside out such that information is recorded or reproduced on/from the both sides of the disk 13.

FIG. 9 is a perspective view showing a modification of the above-mentioned embodiment. In this modification, the pin member 26 supported by four supporting pieces 30 arranged along the inner periphery of the discrimination hole 23 formed in the upper case 11a at regular intervals of 90° is connected with the inner periphery of the discrimination hole 23.

FIG. 10 also shows another modification of the embodiment. In this modification, the pin member 26 supported by two supporting pieces 31 arranged along the inner periphery of the discrimination hole 23 formed in the upper case 11a at regular intervals of 180° is connected with the inner periphery of the discrimination hole 23.

As described above, the number of the supporting pieces 27, 30, and 31 for supporting the pin member 26 can be suitably changed in necessity. In the above-mentioned embodiment, the pin member 26 is supported on the upper case 11a in the above-mentioned embodiments. The same effect can be attained even if the pin members 26 are supported on the lower case 11b shown in FIG. 11.

As described above, according to the present invention, a plurality of supporting pieces are arranged along the inner periphery of the discrimination hole formed in the cartridge body at regular intervals in a circumferential direction so as to support the closing member, and thus the closing member will fail to be undesirably rotated due to the rotation moment in an undesired direction, and can be stably supported.

With this structure, the supporting pieces can be formed with a minimum thickness, and thus the closing member can be easily cut when the closing member is desired to be manually removed from the apparatus. Accordingly, the closing member can be supported in a suitable manner for normal use.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A disk cartridge comprising:

a cartridge body formed as a flat box, for containing a disk therein to be freely rotated, the cartridge body having a flat section on a top side and a flat section on a bottom side facing each other and on each of which is an opening for exposing a part of a surface of the disk to the outside, wherein the cartridge body is provided with a disk insertion portion from which the disk is removed or inserted;

a shutter slidably provided to the cartridge body, for closing the openings formed on the facing flat sections of the cartridge body;

a lid supported by the cartridge body so as to be freely moved between a closing position at which the disk insertion portion is closed and an opening position at which the disk insertion portion is opened, wherein the lid has a flat portion that is placed between the facing flat sections of the cartridge body when the lid is closed;

a hole formed in each side of the facing flat sections of the cartridge body and in the flat portion of the lid such that the cartridge body is penetrated in a thickness direction at a location where the holes are when the lid is closed;

a closing member disposed within the holes, for preventing the lid from being released, and for releasing the lid when the closing member is removed, wherein the closing member is removed from the holes by being urged from one flat section of the cartridge body to the other flat section; and a plurality of supporting pieces formed on an inner periphery of the hole formed in one of the flat sections of the cartridge body and arranged at equally spaced regular intervals in a circumferential direction, the supporting pieces connecting the closing member and the inner periphery of the hole formed in one of the flat sections so as to support the closing member in the hole, wherein the plurality of supporting pieces are arranged at regular intervals of 120° along the inner periphery of the hole in one of the flat sections of the cartridge body in the circumferential direction.

2. A disk cartridge comprising:

a cartridge body formed as a flat box, for containing a disk therein to be freely rotated, the cartridge body having a flat section on a top side and a flat section on a bottom side facing each other and on each of which is an opening for exposing a part of a surface of the disk to the outside, wherein the cartridge body is provided with a disk insertion portion from which the disk is removed or inserted;

a shutter slidably provided to the cartridge body, for closing the openings formed on the facing flat sections of the cartridge body;

a lid supported by the cartridge body so as to be freely moved between a closing position at which the disk insertion portion is closed and an opening position at which the disk insertion portion is opened, wherein the lid has a flat portion that is placed between the facing flat sections of the cartridge body when the lid is closed;

a hole formed in each side of the facing flat sections of the cartridge body and in the flat portion of the lid such that the cartridge body is penetrated in a thickness direction at a location where the holes are when the lid is closed;

a closing member disposed within the holes, for preventing the lid from being released, and for releasing the lid when the closing member is removed, wherein the closing member is removed from the holes by being urged from one flat section of the cartridge body to the other flat section; and a plurality of supporting pieces formed on an inner periphery of the hole formed in one of the flat sections of the cartridge body and arranged at equally spaced regular intervals in a circumferential direction, the supporting pieces connecting the closing member and the inner periphery of the hole formed in one of the flat sections so as to support the closing member in the hole, wherein the plurality of supporting pieces are arranged at regular intervals of 90° along the inner periphery of the hole in one of the flat sections of the cartridge body in the circumferential direction.

* * * * *